US006732093B2

(12) United States Patent
Vally et al.

(10) Patent No.: US 6,732,093 B2
(45) Date of Patent: May 4, 2004

(54) SYSTEMS AND METHODS FOR PERFORMING TEMPORAL LOGIC QUERIES

(75) Inventors: Jean-Max Vally, San Francisco, CA (US); Laura S. Diamondstone, San Francisco, CA (US); Jon Hartlaub, Mountain View, CA (US); E. Gregory Lee, Alto, CA (US); Steven Shafer, Mountain View, CA (US)

(73) Assignee: Pharsight Corporation, Mountain View, CA (US)

( * ) Notice: Subject to any disclaimer, the term of this patent is extended or adjusted under 35 U.S.C. 154(b) by 453 days.

(21) Appl. No.: 09/873,132

(22) Filed: May 31, 2001

(65) Prior Publication Data

US 2002/0194009 A1 Dec. 19, 2002

(51) Int. Cl.[7] .............................. G06F 17/30
(52) U.S. Cl. .................... 707/4; 707/3; 707/5
(58) Field of Search ............ 707/1–10; 369/15

(56) References Cited

U.S. PATENT DOCUMENTS

| | | | | |
|---|---|---|---|---|
| 4,944,037 A | * | 7/1990 | Ando | 369/13.24 |
| 5,999,924 A | * | 12/1999 | Bair et al. | 707/4 |
| 6,185,556 B1 | * | 2/2001 | Snodgrass et al. | 707/3 |
| 6,442,543 B1 | * | 8/2002 | Snodgrass et al. | 707/3 |
| 6,647,382 B1 | * | 11/2003 | Saracco | 707/3 |

OTHER PUBLICATIONS

A. Oberweis, V. Sanger, "GTL—A Graphical Language For Temporal Data", IEEE, 1999, pp. 22–31.*

Daniel J. Nigrin, M.D., MS, Issaac S. Kohane, MD, PHD, "Temporal Expressiveness in Querying a Time–Stamp–based Clinical Database", Journal of the American Medical Information Association, vol. 7, No. 2 Mar./Apr. 2000, pp. 152–163.

Richard T. Snodgrass, *Developing Time–Oriented Database Applications in SQL*, 2000, Morgan Kaufmann Publishers, San Francisco, CA, pp. 1–504.

D.R. Cos and D. Oakes, *Analysis of Survival Data*, 1984, Chapman & HallCRC, pp. 1–200.

Elandt–Johnson & Johnson, *Survival Models and Data Analysis*, 1980, John Wiley and Sons, Inc., New York, pp. 1–457.

James F. Allen, "Maintaining Knowledge about Temporal Intervals", Communications of the ACM, Nov. 1983, vol. 26, No. 11, 832–843.

*American National Standard Database Language SQL*, Oct. 16, 1992, American National Standards Institute, New York, New York, pp. 1–580.

* cited by examiner

Primary Examiner—Greta Robinson
Assistant Examiner—Linh Black
(74) Attorney, Agent, or Firm—Townsend and Townsend and Crew LLP (57) ABSTRACT

Methods of performing temporal logic queries, and systems for performing temporal logic queries, are disclosed. Data associated with statistical reliability criteria are annotated in a data source. Baseline data stored in the data source is summarized. Temporal data requests made upon the data source are automatically merged with the data associated with the statistical reliability criteria, to produce a statistically valid data query. Data query results are optionally provided to a statistics module for processing of statistical analyses.

58 Claims, 4 Drawing Sheets

SYSTEMS AND METHODS FOR PERFORMING TEMPORAL LOGIC QUERIES

FIELD OF THE INVENTION

The invention relates to computer data retrieval systems, and more particularly to methods for performing temporal logic queries using statistical reliability criteria.

BACKGROUND

In analyzing data about certain real-world problems, it is useful to view the data as temporal data. Temporal data typically describe how an observed quantity changes over time or when certain conditions occur. Temporal data are useful for answering questions such as "how often," "how long until," or "is this getting better with time."

Examples of temporal data and possible questions that could be asserted against that temporal data include the following:

Dates of heart attacks (does treatment X reduce the risk of fatal heart attacks?)

Monthly blood pressure readings (does treatment X reduce high blood pressure?)

Periods of hospitalization (how long are patients with condition X staying in the hospital?)

Arrest records (does community policing have a favorable effect? for how long?)

Point-of-sale information for a retail store (which ad campaigns improved sales?)

Temporal data may be organized into "chronologies," which are sequences of related temporal data. For "period chronologies" each datum has a start- and end-time. For "event chronologies," each datum has an "event" time. Each datum usually has associated information. The sequence of hospital stays for a patient would be a period chronology, and its associated data might include information regarding diagnosis, facility, and admitting physician. The dates of heart attacks for a patient would be an event chronology, and its associated data might include a severity score.

Temporal data may also contain "eternal" data. These are temporal elements that are time-invariant, per-patient data. Eternal data is true for all observed time. For example, gender, county of birth, date of birth, date of death, index date, censoring date, etc. are stored as eternal facts. These eternal facts have proven useful in temporal logic manipulations, and also provide a way of packaging some of the "critical" data, such as an index or right-censor date, as well as computationally useful data, such as date-of-birth, which is used to convert date-of-event into age-at-event. Such temporal objects thus include: period chronologies, event chronologies and eternal facts. These are all segregated by patient. Additional patient-independent objects may also be provided.

Temporal logic is a useful way of manipulating temporal data. Two periods can have a relationship to each other. For example, two periods can have a containment relationship, where period A completely contains period B, or an overlap relationship, where period A and period B partially overlap each other. Temporal logic extends these notions by providing operations that combine temporal data. For example, if it is desirable to know which patients had heart attacks while being treated for diabetes, this can involve an operation that combines temporal information about heart attacks with temporal information about periods of treatment for diagnosis.

Table 1, below, shows some representative operations and their application.

TABLE 1

| | |
|---|---|
| Convert event to time period | Find the period "30 days before the first heart attack". This uses the event "first heart attack" as the end of a period of 30 days. |
| Invert time period | Find periods when a patient was not on antibiotics. |
| Intersect time periods | Find periods when a patient was on beta-blockers and antibiotics. |

Operations can be cascaded. For example, "patients who were not on beta blockers in the 30 days before a heart attack" can be identified by:

converting the heart-attack event to a 30-day period ("convert event to time period"), finding the periods when the patient was not on beta blockers ("invert time period"), and Intersecting the two resulting chronologies ("intersect time periods").

Temporal data introduces a rich variety of complexities into analysis. Causality is often associated with temporal order. Many scientific studies are based on the paradigm "intervene, then observe what happens afterward." Similarly, with temporal data assertions can often be made about duration: "the patient was pain-free for 4.5 hours."

Implicit in analyzing temporal data are the concepts of truncation and censoring: data is often gathered from only a limited period of time. Knowledge of what happened before observation begins is limited, and is probably completely unknown after the period in which data is gathered. This phenomenon is called "truncation" of data, referring to the period of observation for the aggregate of units (e.g. subjects, participants, or patients). "Censoring" refers to starts and stops of observation at the level of the unit. Thus, individual units may have varying lengths of observation, which can profoundly alter techniques appropriate for statistically valid uses of temporal data.

Consider a study comparing two methods for preventing heart attacks in high-risk patients. The patients are treated and then monitored for a finite period of time, such as four months. The data would be left-truncated before treatment and right-truncated after the four months. At the end of the study, it is desired to compare the average time-to-heart-attack for the two treatment groups. During the four months, some patients will have reported a heart attack. Assuming they have had continuous observation since treatment began, their contribution to the average time-to-heart-attack for their treatment group is obvious. However, special considerations may have to be given to the patients who may have not been under observation for the entire four months duration. Perhaps some patients died, dropped out of the study or migrated from the area. Their survival time during the four months must be measured, but it's often not clear how their observation time should be incorporated into the comparison of average time-to-heart-attack. Using four months for each of them is plausible but may underestimate the true average time-to-heart-attack, just as assuming that they will never have an attack overestimates the time-to-heart-attack. This lack of data throughout the aggregate observational duration is termed "censoring." Specifically, right-censoring occurs when patients are observed from the left-truncation date, but are not monitored through the entire period up to the right-truncation date. When individual units are observed until the aggregate right-truncation date (such as the official end of the study), their right-censoring and right-truncation dates are identical, and in practicality synonymous.

A similar situation can occur when the time after the beginning of aggregate observation is relevant to an analysis, but the observed or collected information about the past is subject to a "begin date" cutoff. This is called "left censoring," and may occur, for example, when a patient is a late entry into an ongoing study.

The heart attack study example also introduces the notion of an index date, which is the date that a subject formally entered the study. The time after the index date is often called the "longitudinal follow-up period;" as noted, this time period can be limited by right-censoring, and is ultimately limited by right-truncation for the aggregate.

Information pertaining to the period before the index date is often called the "baseline period." The baseline period usually extends only a limited time into the past, for various reasons such as: lack of data, limitations of recall, or because the earlier data is not informative.

Critical data, such as the date data discussed above, depend on factors such as the design of the data or study or the data subject (e.g. patient). The left- and right-truncation dates, for example, depend on the data or study design. Each individual in a study cohort may have different index, right-, and left-censor dates, yielding differing durations of longitudinal follow-up.

Statisticians have developed methods for the analysis of temporal data, which is often referred to as "analysis of longitudinal data." For example, statistical programs such as SAS and SPLUS incorporate routines for analyzing longitudinal data (e.g. survival analysis or Kaplan-Meier methods). The routines use information such as right-censor date, but they also require that the user has correctly computed each unit's observation time. Moreover, these systems do not offer any automated facilities for use of critical dates without prior manual computation of the critical dates. These systems also do not offer any automated facilities for integrating temporal logic, nor for developing computations based on temporal logic, which is particularly difficult to formulate in a manual process.

Relational database systems often have a data type for dates. The 1992 SQL standard defines temporal data types, such as INTERVAL. These data types are potentially useful as building blocks for a temporal logic system. For example, Snodgrass, R., *Developing time-oriented database applications in SQL*. Morgan Kaufmann, California 2000, describes an approach where SQL fragments can be used to express basic temporal operations, such as intersection of periods. Also, Nigrin, Daniel J, and Kohane, Isaac S, *Temporal expressiveness in querying a time-stamp-based clinical database*, J American Medical Informatics Association, 2000; 7(2); 152–163, describes an implementation of temporal logic using a relational database system. However, these database system references do not extend the temporal operations to incorporate the statistical concepts necessary for correct analysis of longitudinal data. Without automatic incorporation of the appropriate statistical concepts, the expressivity of temporal logic can be used to make statistically inappropriate uses of temporal data.

SUMMARY OF THE INVENTION

In order to properly analyze temporal data using these statistical analysis methods, it is useful to take into consideration statistical reliability criteria, such as the index date, left- and right-truncation dates, left- and right-censoring dates and other such critical data. It is also useful to ensure that the data before and after the index date (respectively "baseline" and "follow-up") is regarded separately.

In an aspect of an embodiment of the invention, critical data from a data source is automatically merged with a temporal data request, to produce a statistically reliable temporal data query.

In another aspect of an embodiment of the invention, the data source is annotated with metadata, the metadata identifying critical data within the data source, the critical data embodying a statistical reliability criterion.

In another aspect of an embodiment of the invention, baseline information contained in the data source is summarized.

Other and further aspects of the invention will become apparent in view of the following drawings and detailed description of preferred embodiments.

DETAILED DESCRIPTION OF THE PREFERRED EMBODIMENTS

In one embodiment of the invention, a data source, such as a collection of data about patients in a clinical research study, is provided. This collection of data can be stored as a series of records, with each record containing one or more fields containing data that notes a particular event that occurred to a particular patient at a particular date during that patient's life. An example of a collection of data for a pair of patients is shown in Table 2 below.

TABLE 2

| Record ID | Date | Patient ID | Event Code | Description |
|---|---|---|---|---|
| 1 | Mar. 1, 2000 | 1 | 10 | Suffered Heart Attack |
| 2 | Mar. 20, 2000 | 1 | 20 | Entered Clinical Study |
| 3 | Apr. 1, 2000 | 1 | 30 | Started Beta-Blockers |
| 4 | Apr. 10, 2000 | 2 | 20 | Entered Clinical Study |
| 5 | Apr. 20, 2000 | 1 | 10 | Suffered Heart Attack |
| 6 | May 1, 2000 | 1 | 35 | Ended Beta-Blockers |
| 7 | May 15, 2000 | 2 | 30 | Started Beta-Blockers |
| 8 | June 20, 2000 | 1 | 100 | Lost Health Insurance, left study |
| 9 | July 10, 2000 | 2 | 35 | Ended Beta-Blockers |
| 10 | July 12, 2000 | 2 | 10 | Patient suffered heart attack |
| 11 | July 12, 2000 | 2 | 110 | Patient died, left research study |

Referring to Table 2, record 1 indicates that patient 1 suffered a heart attack. Record 2 indicates patient 1 formally entered the study. Record 3 indicates patient 1 started a course of treatment using beta-blockers. Record 5 indicates patient 1 suffered a heart attack. Record 6 indicates patient 1 stopped the beta-blocker treatments. Finally, Record 8 indicates patient 1 then lost his health insurance and left the study.

Also referring to Table 2, record 4 indicates patient 2 entered the study. Record 7 indicates patient 2 started the beta-blocker treatment. Record 9 indicates patient 2 ended the beta-blocker treatment. Record 10 indicates patient 2 suffered a heart attack. Finally, record 11 indicates patient 2 then died, leaving the study.

Several chronologies can be extracted from the temporal data in Table 2. For example, each entry is itself an event chronology. A collection of events is also an event chronology. Thus, for example, an event chronology can be described for patient 1 indicating all heart attacks suffered by patient 1. This event chronology includes the heart attack events of Mar. 1, 2000 and Apr. 20, 2000. Similar event chronologies can be extracted for a variety of other events of interest to a user of the temporal data.

Additionally, a period chronology can be described for each patient indicating the time the patient was in the study (Mar. 20, 2000–Jun. 20, 2000 for patient 1, Apr. 10, 2000–Jul. 12, 2000 for patient 2). Other period chronologies include the time patient 1 was on beta-blockers (Apr. 1, 2000–May 1, 2000), or the time patient 1 was not on beta-blockers (before Apr. 1, 2000 and after May 1, 2000). Similar period chronologies can be extracted for a variety of other periods of interest to a user of the temporal data.

In order for this data to be useful for performing a statistically valid analysis of longitudinal data, it is useful that data requests made to the data source be verified, and modified where desired, such that the data requests take into consideration statistical reliability criteria, such as the index date and the left- and right-truncation and censor dates. Additionally, it is useful for the data before and after the index date to be regarded separately.

In some embodiments, the data source is annotated with metadata that identifies for each patient in the database critical data such as the index date and the left- and right-censor dates. The particular annotations applied to a given data source depend upon the way the data in the data source is represented. In the data source of Table 2, for example, an annotation is made indicating that an Event Code of 20 represents the index date for each patient in the data source. Likewise, an Event Code in the range 100–199 represents the various possible right-censor dates for each patient in the data source. Other data of interest to a user of the data source are similarly annotated.

A separation between data from before (baseline) and after (follow-up) the index date is also enforced. Baseline data describe and characterize subjects at the index date (the start of follow-up). These characteristics are often relevant to explaining some of the variability in occurrence and timing of events during follow-up. In statistical language, these characteristics might be considered prognostic variables or confounders. Statistical procedures such as stratification and adjustment help to disentangle relationships among potential etiologic or prognostic characteristics and events.

For example, consider a patient with a history of a heart attack. The patient's prognosis for survival is different from a patient without a history of cardiovascular disease. Age may confound the relationship between pre-existing heart disease and survival. That is, a very old patient will likely have a shortened life span compared to a younger patient regardless of past cardiovascular events.

In some embodiments, manipulation of several baseline characteristics into strata simultaneously is allowed. This stratification allows inspection of mutually exclusive combinations of selected characteristics. For example, with two characteristics with binary states (history of heart attack and no history of heart attack; very old age and younger age) four possible mutually exclusive combinations may be compared simultaneously.

Temporal logic operations on baseline characteristics helps determine proportions of subjects with certain characteristics and also allows for evaluating combinations of characteristics with respect to events or outcomes during follow-up.

In some embodiments, manipulation of baseline characteristics is supported by reducing all of the information prior to the index date to summary values, such as "has/doesn't have a history of heart attack." For example, patient 1 of Table 2 above has a summary value of "has a history of heart attack" created. Patient 2 of Table 2 has a summary value of "doesn't have a history of heart attack" created. Similar summary values are created for other baseline information. The baseline information may be processed into the summary values before loading the data into the data source. The baseline information may also be summarized dynamically, at query-time.

Once the data source has been annotated with information identifying the critical data useful to insuring that queries made on the data will conform to a statistically valid longitudinal analysis, and the baseline data are optionally summarized, the data source is then ready to be queried by users.

Figure 1:
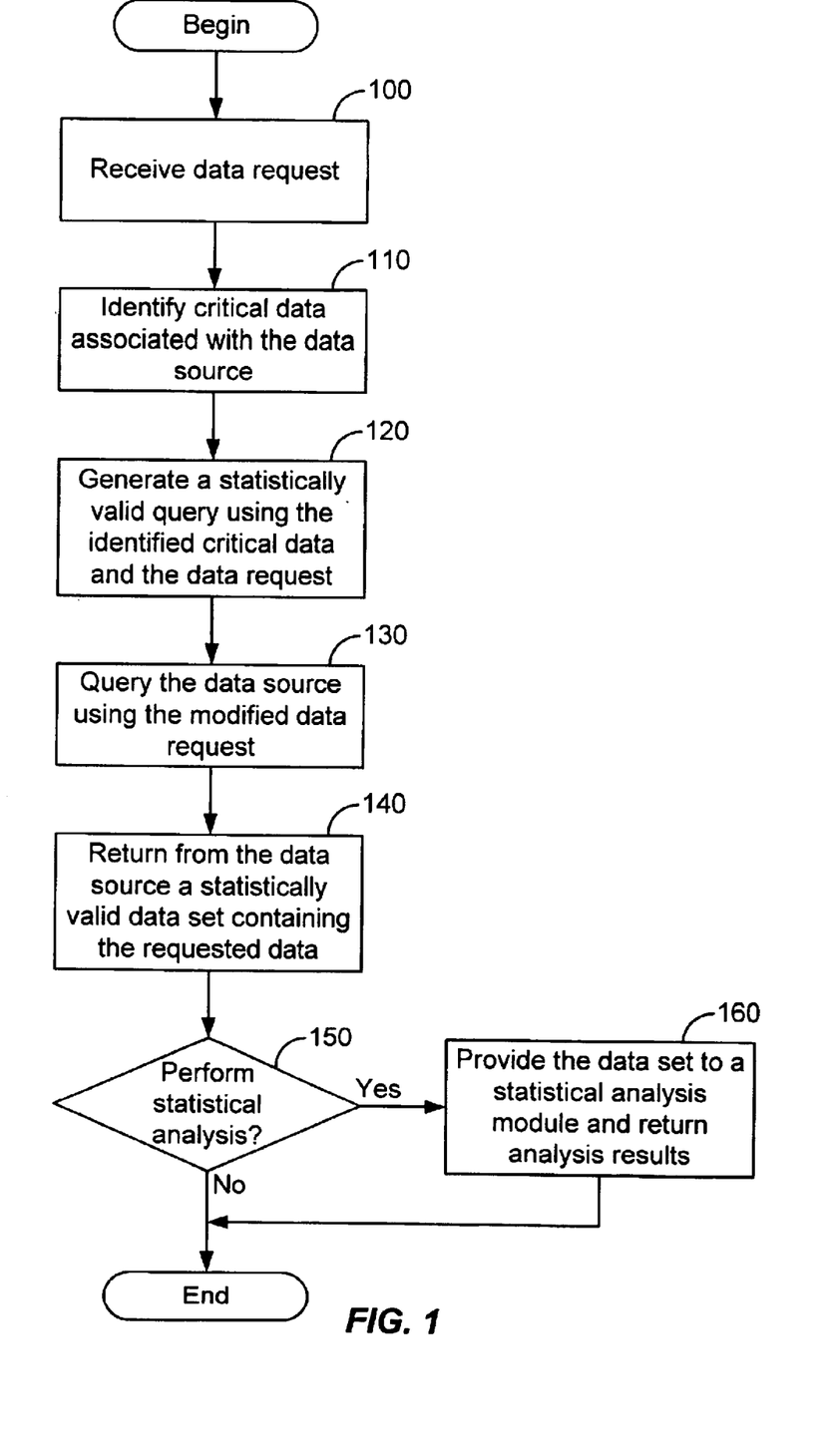
FIG. 1 is a flowchart of a method of obtaining statistically valid temporal data from a data source, in accordance with an embodiment of the invention.

A temporal data request in accordance with an embodiment of the invention follows the method of FIG. 1. The temporal data request is received by a request processor at step 100. The temporal data request includes at least one event chronology or period chronology. Eternal data may also be incorporated into the temporal data request. The temporal data request can include any number of these chronologies, or can include a series of operations that collectively define one or more event or period chronologies. The time periods included in this data request can span any length of time, and can include time periods in the baseline, the follow-up, and after the follow-up.

At step 110, the request processor polls the data source to identify the various critical data defined for that data source. This critical data includes the index date, the left- and right-censor dates, and any other critical data that was specified for the particular data source. The critical data is data that has been identified ahead of time for the particular data source being queried. The critical data can vary from data source to data source.

At step 120, the various event and period chronologies contained within the temporal data request are compared, for each patient in the data source, with the various critical data identified for that data source. The chronologies and the critical data are merged together to create a merged data request. Various actions are taken to modify the parameters of the temporal data request, depending upon the precise nature of the chronologies contained in the data request and their relationships to the critical data. Once the parameters of the temporal data request have been modified as desired, the merged data request now represents a statistically valid longitudinal analysis query on the data source.

This merged data request is then applied to the data source, as a temporal data query, at step 130. The temporal data query returns a data set describing the requested temporal data, as modified to insure conformance with appropriate statistical reliability criteria, at step 140. This data set includes annotations comprising metadata identifying the critical data. A determination is then made, at step 150, whether or not a statistical analysis will be performed on the data set. If a statistical analysis is to be performed, then at step 160, the data set is routed to a statistical analysis module for performance of the statistical analysis. The statistical analysis module makes use of the annotated metadata described above, to generate a more accurate analysis. Once the statistical analysis is completed, or if no analysis is performed, the data set is returned to the data requestor, and the method then terminates.

Examples of particular modifications or restrictions on the temporal data request, made at step 120 of the method of FIG. 1 to ensure statistical validity, will now be discussed.

Within the temporal data request, operations on the follow-up period that would cause a crossing of the index date are identified and handled appropriately. In the heart-attack example given above, a 30-day period was constructed by counting back from the first heart attack in the follow-up period. If this period crosses the index-date, it is truncated, and the resulting period runs from the index date to the date of first heart attack. Symbolically, from date-of-heart-attack the period {max (date-of-heart-attack-30 days, index date), date-of-heart-attack} is computed. In the same example, "not on beta-blockers" involves calculations starting with {start beta-blocker, end beta-block} and applying the index and right-censor dates to generate {max (index date, start beta-blocker)}∪{min (end beta-blocker, right-censor date)}. This produces the period the patient was on beta-blockers. This period is then inverted as discussed below, to generate the period the patient was not on beta-blockers. Temporal logic rules may require additional processing to handle degenerate results, such as when the resulting start and end dates are the same. Methods of processing degenerate results are well known to those skilled in the art, and are not critical to the invention.

To invert a period chronology, the union is taken of 1) the period before the start of the period chronology to be inverted, and 2) the period after the end of the period chronology to be inverted. To remain statistically valid, the period before the start of the period chronology to be inverted is limited by the index date, and the period after the end of the period chronology to be inverted is limited by the right-censor date. Thus, for example, the period that patient 1 of Table 2 above was not on beta-blockers is expressed symbolically as {index date, max (index date, start beta-blocker)}∪{min(end beta-blocker, right-censor date), right-censor date}. Filling in the actual date values results in the following formula: {Mar. 20, 2000, max (Mar. 20, 2000, Apr. 1, 2000)}∪{min(May 1, 2000, Jun. 20, 2000), Jun. 20, 2000)}, which resolves to: {Mar. 20, 2000, Apr. 1, 2000}∪{May 1, 2000, Jun. 20, 2000}. Cases where there are multiple periods to be inverted are handled similarly, by additionally taking the union of all of the periods between the period chronologies being considered.

To offset a period chronology, the start and end times are modified by adding a constant to them. This may produce times that are before the index date (when making the start time earlier) or after the right-censor date (when making the start time later), and the system should detect these cases and handle them appropriately (e.g. by truncation). For example, if the data request specifies a period 30 days before a heart attack, then for patient 1 of Table 2, the range Mar. 20, 2000–Apr. 20, 2000 is truncated by the index date, and the modified range is Apr. 10, 2000–Apr. 20, 2000.

To offset an event chronology, an event time is modified by adding a constant to it. This may produce times that are before the index date (when making the start time earlier) or after the right-censor date (when making the start time later), and the system should detect these cases and handle them appropriately (e.g. by truncating event offsets that fall outside the critical dates). For example, if the data request specifies an event chronology 30 days prior to the start of beta-blockers, then for patient 1 of Table 2, the event chronology falls on Apr. 15, 2000, before the index date of Apr. 10, 2000, and is therefore truncated.

To scale a period chronology, the start or end times are modified to make the period larger or smaller (e.g. "make 10% longer"). There are at least three ways to scale a period. First, the start time is fixed, and the period length is modified to change the end time. Second the end time is fixed, and the period length is modified to change the start time. Third, the midpoint of the period is fixed, and the length is modified to change both the start and end times. This scaling may produce times that are before the index date (when making the start time earlier) or after the right-censor date (when making the start time later), and the system should detect these cases and handle them appropriately (e.g. by truncation). For example, if the period chronology describing the time patient 2 of Table 2 was on beta-blockers is scaled upwards by 100%, by fixing the end time of the period, then the scaled start time would fall before the index date for patient 2, and would be truncated, so the modified scaled period chronology would use the index date as the start time.

To convert an event chronology to a period chronology, the event time is used as the start (or end) time for the period, and the end (or start) time is computed, for example by adding 30 days to the start (or end) time. This may produce times that are before the index date (when making the start time earlier) or after the right-censor date (when making the start time later), and the system should detect these cases and handle them appropriately, e.g. by truncation, as discussed above.

Similarly, within the temporal data request, operations on the baseline period that cause a crossing of the index date are identified and handled appropriately. For example, event and period chronologies that cross over into the follow-up period are truncated. Likewise, operations, within the temporal data request, on the follow-up period that cause a crossing of the right-censor date are also identified and handled appropriately. For example, event and period chronologies that cross over into the post-follow-up period are truncated.

Proper statistical analysis may involve measuring time to an event of interest as a relative time period from the individual index date for each patient to the time of the event of interest. These sorts of data requests are automatically recognized and the known index date is used as the start date of the period for each patient. Similarly, in measuring time from an event of interest, the known right-censor date is automatically recognized and used as the end date of the period for each patient.

When making certain data requests, such as a request for data to do statistical analyses such as generating a Kaplan-Meier plot, or stratifying patients based on a particular reference event, the calculations of the relevant time periods are automatically made relative to the critical data for each patient.

As suggested in the heart-attack example, right-truncation is due to 1) a planned end of observation period, e.g. data were only collected for four months, or 2) right-censoring from an unplanned end of observation, e.g. loss to follow up: patient moved out of study area, did not come in for scheduled visits, lost health coverage, or death of the patient. These differences, which may be important to the temporal operations or to the resulting statistical analysis, are preferably annotated in the data source.

Data requests and analysis on the results of the data requests can then use these differences appropriately. For example, a proper statistical analysis of a set of study data may assign a different statistical weight or significance to a particular chronology, depending on the underlying reason that the chronology was right-censored. A chronology that was right-censored by the patient's death may be treated differently than a chronology that was right-censored by the patient's loss of health coverage. By annotating the data source with critical data such as the index date and the various censoring and truncation dates, this critical data can be used to do statistical analysis, for example by a statistical analysis module such as SAS or SPLUS.

Inherited properties of chronologies are preferably recognized and handled appropriately, relative to the critical data annotated in the data source. For example, a first period chronology has a start date and an end date. A second period chronology is derived from the first period chronology by appending the time from the index date to the start of the period ("time from index date") as associated data. The second period chronology is still a period chronology, having the same start and end times as the first period chronology. A third period chronology is then created by offsetting the second period chronology by 30 days. In an embodiment, the inherited property "time from index date" is also offset by 30 days.

Figure 2:
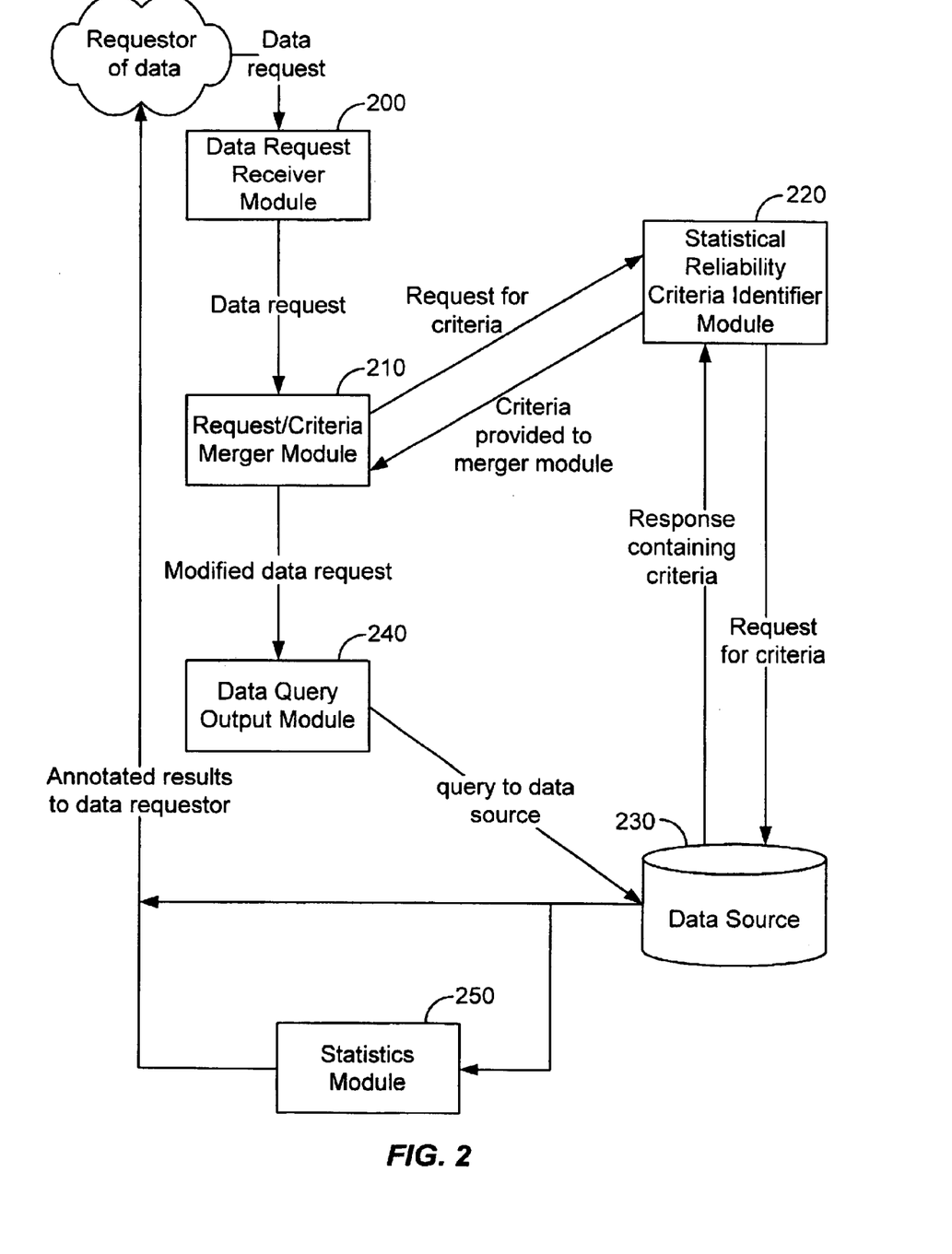
FIG. 2 is a diagram of a system for processing temporal data requests, in accordance with an embodiment of the invention.

Turning to FIG. 2, a diagram of a system in accordance with an embodiment of the invention will now be discussed. The system includes a data request receiver module 200. The data request receiver module 200 receives a temporal data request. The temporal data request can come from various data requestors. Examples of sources of the temporal data request include: a library of stored temporal data requests, a user interface used to construct temporal data requests, an automated process that automatically generates temporal data requests, etc. The data request receiver 200 routes the received data request to a request/criterion merger module 210.

The request/criterion merger module 210 merges the temporal data request with one or more statistical reliability criteria, and generates a merged data request that is statistically reliable for performing a longitudinal analysis of the temporal data requested by the merged data request. When the request/criterion merger module 210 receives the temporal data request from the data request receiver 200, the request/criterion merger module 210 requests the statistical reliability criteria from a statistical reliability criteria identifier module 220.

The statistical reliability criterion identifier module 220 transmits a request for the statistical reliability criteria to a data source 230, which contains both the data that the data request will be operating on, as well as metadata describing the statistical reliability criteria for the data source 230. These statistical reliability criteria include critical data such as the index date and the left- and right-censor dates that are defined for the data source 230. The data source 230 returns the statistical reliability criteria to the statistical reliability criteria identifier module 220, which in turn passes the statistical reliability criteria on to the request/criterion merger module 210.

The request/criterion merger 210, upon receipt of the statistical reliability criteria, checks the various elements of the temporal data request and modifies them as discussed above to insure that the merged data request will generate statistically valid results. The request/criterion merger module 210 then outputs a merged data request to a data query output module 240.

The data query output module 240 receives the modified data request, optionally converts the modified data request into a format understandable by the data source 230, and then queries the data source 230. The data source 230 processes the query and generates an annotated result set, which is transmitted back to the source of the data request.

Prior to being transmitted back to the source of the data request, the annotated result set can optionally be transmitted to a statistics module 250. The statistics module 250 performs a statistical analysis of the annotated result set, and returns a statistical evaluation of the annotated result set back to the source of the data request.

System Architecture Overview

Figure 3:
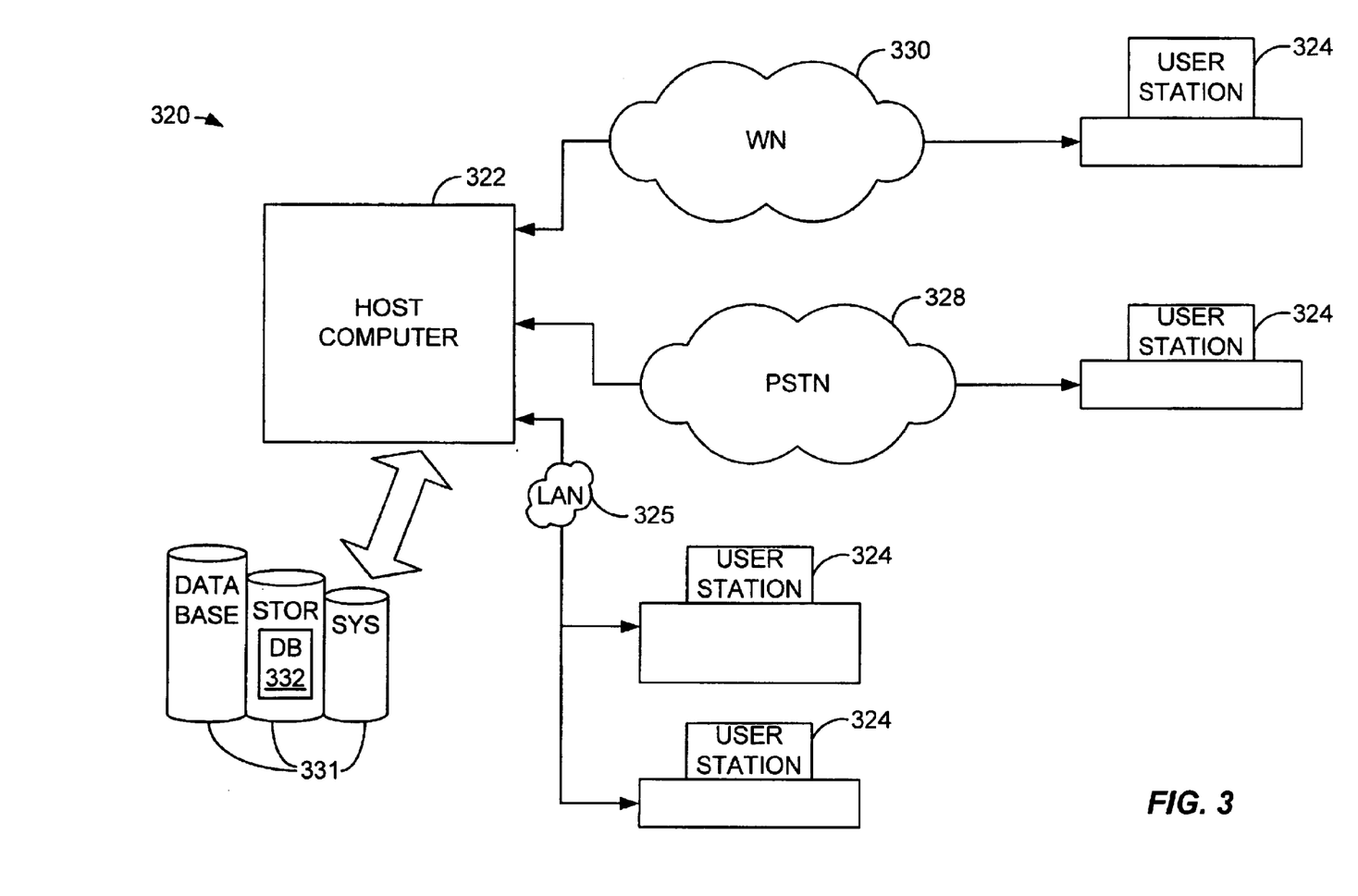
FIGS. 3 and 4 represent a computer architecture in accordance with an embodiment of the invention.

Referring to FIG. 3, in an embodiment, a computer system 320 includes a host computer 322 connected to a plurality of individual user stations 324. In an embodiment, the user stations 324 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 324 are connected to the host computer 322 via a local area network ("LAN") 325. Other user stations 324 are remotely connected to the host computer 322 via a public telephone switched network ("PSTN") 328 and/or a wireless network 330.

In an embodiment, the host computer 322 operates in conjunction with a data storage system 331, wherein the data storage system 331 contains a database 332 that is readily accessible by the host computer 322.

In alternative embodiments, the database 332 may be resident on the host computer, stored, e.g., in the host computer's ROM, PROM, EPROM, or any other memory chip, and/or its hard disk. In yet alternative embodiments, the database 332 may be read by the host computer 322 from one or more floppy disks, flexible disks, magnetic tapes, any other magnetic medium, CD-ROMs, any other optical medium, punchcards, papertape, or any other physical medium with patterns of holes, or any other medium from which a computer can read.

In an alternative embodiment, the host computer 322 can access two or more databases 332, stored in a variety of mediums, as previously discussed.

Figure 4:
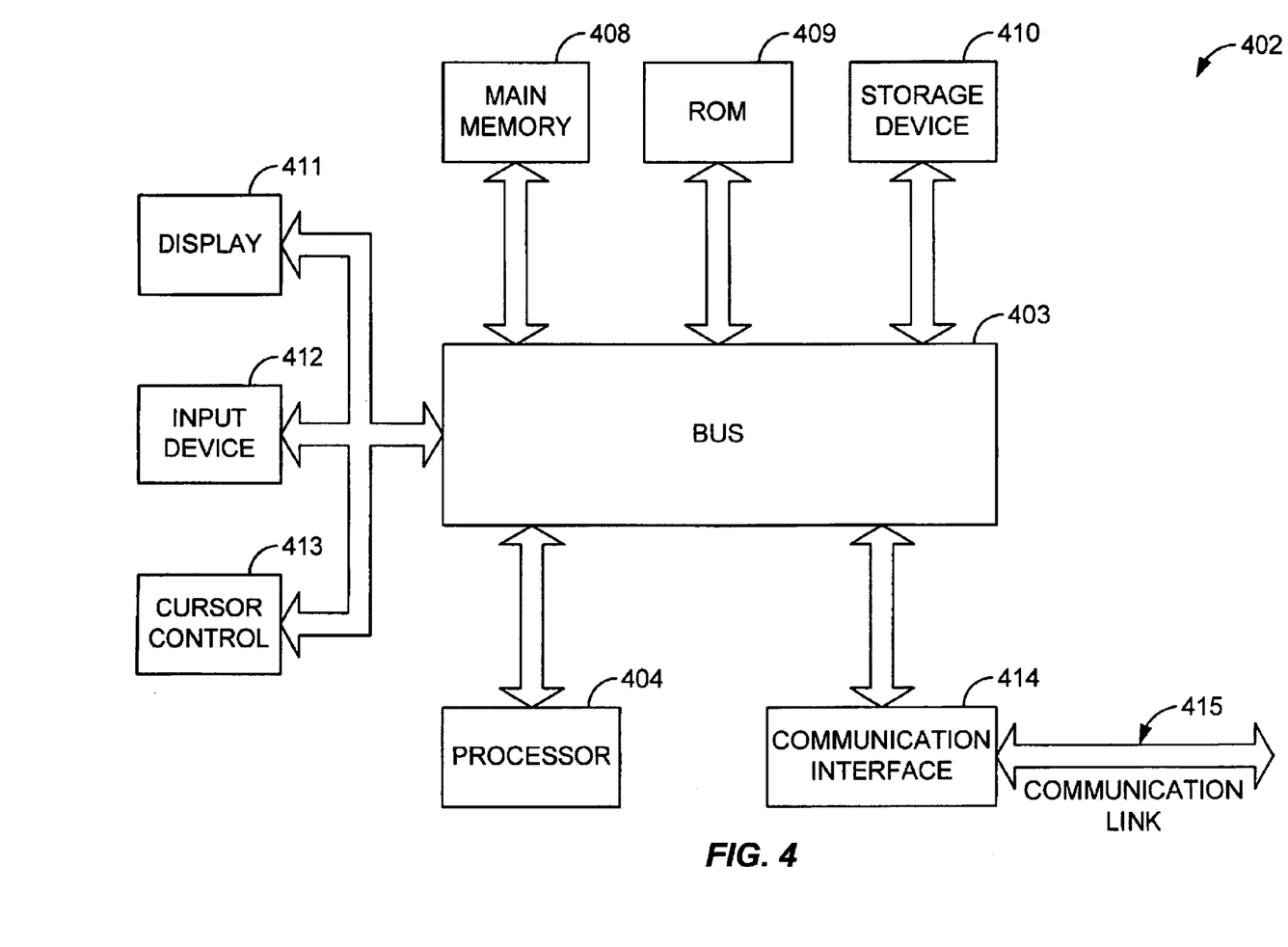

Referring to FIG. 4, in an embodiment, each user station 324 and the host computer 322, each referred to generally as a processing unit, embodies a general architecture 402. A processing unit includes a bus 403 or other communication mechanism for communicating instructions, messages and data, collectively, information, and one or more processors 404 coupled with the bus 403 for processing information. A processing unit also includes a main memory 408, such as a random access memory (RAM) or other dynamic storage device, coupled to the bus 403 for storing dynamic data and instructions to be executed by the processor(s) 404. The main memory 408 also may be used for storing temporary data, i.e., variables, or other intermediate information during execution of instructions by the processor(s) 404.

A processing unit may further include a read only memory (ROM) 409 or other static storage device coupled to the bus 403 for storing static data and instructions for the processor(s) 404. A storage device 410, such as a magnetic disk or optical disk, may also be provided and coupled to the bus 403 for storing data and instructions for the processor(s) 404.

A processing unit may be coupled via the bus 403 to a display device 411, such as, but not limited to, a cathode ray tube (CRT), for displaying information to a user. An input device 412, including alphanumeric and other keys, is coupled to the bus 403 for communicating information and command selections to the processor(s) 404. Another type of user input device may include a cursor control 413, such as, but not limited to, a mouse, a trackball, a fingerpad, or cursor direction keys, for communicating direction information and command selections to the processor(s) 404 and for controlling cursor movement on the display 411.

According to one embodiment of the invention, the individual processing units perform specific operations by their respective processor(s) 404 executing one or more sequences of one or more instructions contained in the main memory 408. Such instructions may be read into the main memory 408 from another computer-usable medium, such as the ROM 409 or the storage device 410. Execution of the sequences of instructions contained in the main memory 408 causes the processor(s) 404 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 404. Such a medium may take many forms, including, but not limited to, non-volatile, volatile and transmission media. Non-volatile media, i.e., media that can retain information in the absence of power, includes the ROM 409. Volatile media, i.e., media that can not retain information in the absence of power, includes the main memory 408. Transmission media includes coaxial cables, copper wire and fiber optics, including the wires that comprise the bus 403. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 404 can retrieve information.

Various forms of computer-usable media may be involved in providing one or more sequences of one or more instructions to the processor(s) 404 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 403 may receive the infrared signals and place the instructions therein on the bus 403. The bus 403 may carry the instructions to the main memory 408, from which the processor(s) 404 thereafter retrieves and executes the instructions. The instructions received by the main memory 408 may optionally be stored on the storage device 410, either before or after their execution by the processor(s) 404.

Each processing unit may also include a communication interface 414 coupled to the bus 403. The communication interface 414 provides two-way communication between the respective user stations 324 and the host computer 322. The communication interface 414 of a respective processing unit transmits and receives electrical, electromagnetic or optical signals that include data streams representing various types of information, including instructions, messages and data.

A communication link 415 links a respective user station 324 and a host computer 322. The communication link 415 may be a LAN 325, in which case the communication interface 414 may be a LAN card. Alternatively, the communication link 415 may be a PSTN 328, in which case the communication interface 414 may be an integrated services digital network (ISDN) card or a modem. Also, as a further alternative, the communication link 415 may be a wireless network 330.

A processing unit may transmit and receive messages, data, and instructions, including program, i.e., application, code, through its respective communication link 415 and communication interface 414. Received program code may be executed by the respective processor(s) 404 as it is received, and/or stored in the storage device 410, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

We claim:

1. A computer-implemented method for obtaining temporal data from a data source, comprising:
   receiving a temporal data request for temporal data, the temporal data being stored in the data source;
   identifying critical data in the data source, the critical data corresponding to a statistical reliability criterion;
   generating a temporal data query based at least in part on the temporal data request and the critical data; and
   retrieving temporal data from the data source in response to the temporal data query.

2. The computer-implemented method of claim 1, wherein identifying critical data comprises identifying metadata associated with the data source, the metadata identifying an element of the data source as containing the critical data.

3. The computer-implemented method of claim 2, wherein the element of the data source is a field of a database record.

4. The computer-implemented method of claim 1, wherein the data source comprises eternal data.

5. The computer-implemented method of claim 1, wherein the critical data comprises index date data.

6. The computer-implemented method of claim 1, wherein the critical data comprises right-censor date data.

7. The computer-implemented method of claim 1, wherein the critical data comprises left-censor date data.

8. The computer-implemented method of claim 1, wherein the critical data comprises right-truncation date data.

9. The computer-implemented method of claim 1, wherein the critical data comprises left-truncation date data.

10. The computer-implemented method of claim 1, wherein the data source comprises event chronology data.

11. The computer-implemented method of claim 1, wherein the data source comprises period chronology data.

12. The computer-implemented method of claim 1, wherein the temporal data query is generated by modifying the temporal data request using the critical data.

13. The computer-implemented method of claim 12, wherein the temporal data request is modified by limiting a period chronology of the temporal data request using the critical data.

14. The computer-implemented method of claim 13, wherein the critical data comprises an index date, and wherein the period chronology is limited by truncating a portion of the period chronology occurring before the index date.

15. The computer-implemented method of claim 13, wherein the critical data comprises an index date, and wherein the period chronology is limited by truncating a portion of the period chronology occurring after the index date.

16. The computer-implemented method of claim 13, wherein the critical data comprises a right-censor date, and wherein the period chronology is limited by truncating a portion of the period chronology occurring after the right-censor date.

17. The computer-implemented method of claim 13, wherein the critical data comprises a left-censor date, and wherein the period chronology is limited by truncating a portion of the period chronology occurring before the left-censor date.

18. The computer-implemented method of claim 12, wherein the temporal data request is modified by limiting an event chronology of the temporal data request using the critical data.

19. The computer-implemented method of claim 18, wherein the critical data comprises an index date, and wherein the event chronology is limited by truncating a portion of the event chronology occurring before the index date.

20. The computer-implemented method of claim 18, wherein the critical data comprises an index date, and wherein the event chronology is limited by truncating a portion of the event chronology occurring after the index date.

21. The computer-implemented method of claim 18, wherein the critical data comprises a right-censor date, and wherein the event chronology is limited by truncating a portion of the event chronology occurring after the right-censor date.

22. The computer-implemented method of claim 18, wherein the critical data comprises a left-censor date, and wherein the event chronology is limited by truncating a portion of the event chronology occurring before the left-censor date.

23. The computer-implemented method of claim 12, wherein the temporal data request is modified by modifying an inherited property of an element of the temporal data request using the critical data.

24. The computer-implemented method of claim 1, wherein a first baseline characteristic and a second baseline characteristic are simultaneously stratified.

25. The computer-implemented method of claim 1, further comprising summarizing baseline information contained in the data source.

26. A system for receiving and processing a temporal data request made on a data source, comprising:
   a statistical reliability criterion identifier module configured for incorporating a statistical reliability criterion into the temporal data request, and
   a data query output module configured for building a data query using the temporal data request and the statistical reliability criterion, and for applying the data query to the data source.

27. A system for receiving and processing a temporal data request made on a data source, comprising:
   a statistical reliability criterion identifier module configured for identifying a statistical reliability criterion associated with the data source;
   a data request receiver module configured for receiving the temporal data request from a data requestor;
   a request/criterion merger module configured for creating a merged data request by merging the statistical reliability criterion identified by the statistical reliability criterion identifier module and the temporal data request received by the data request receiver module; and
   a data query output module configured for receiving the merged data request and supplying a temporal data query to the data source.

28. The system of claim 27, wherein the statistical reliability criterion comprises metadata associated with one or more data elements of the database.

29. The system of claim 27, wherein the data requestor comprises a graphical user interface.

30. The system of claim 27, wherein the request/criterion merger module merges the statistical reliability criterion with the temporal data request by insuring the scope of the temporal data request conforms to a statistical standard embodied by the statistical reliability criterion.

31. The system of claim 27, wherein the data query output module outputs the temporal data query in a data source language format.

32. The system of claim 27, further comprising a statistics module configured for performing a statistical analysis on a result set from the data source, the result set comprising results of the temporal data query.

33. A system for receiving and processing a temporal medical data request made on a patient data source, comprising:
   a statistical reliability criterion identifier module configured for identifying an epidemiological statistical reliability criterion associated with the patient data source;
   a data request receiver module configured for receiving the temporal medical data request from a graphical user interface;
   a request/criterion merger module configured for creating a merged data request applying the epidemiological statistical reliability criterion to limit the range of data requested in the temporal medical data request to that data which is statistically reliable using accepted epidemiological standards;
   a data query output module configured for receiving the merged data request and for supplying a temporal data query to the patient data source; and
   a statistics module configured for receiving from the data source an annotated result set, the annotated result set containing the results of the temporal data query and associated metadata containing information about critical data associated with the annotated result set, performing a statistical analysis on the annotated result set, and providing the statistical analysis to the graphical user interface.

34. A computer program product that includes a medium useable by a processor, the medium having stored thereon a sequence of instructions which, when executed by said processor, causes said processor to execute a computer-implemented method for obtaining temporal data from a data source, comprising:

receiving a temporal data request for temporal data, the temporal data being stored in the data source;

identifying critical data in the data source, the critical data corresponding to a statistical reliability criterion;

generating a temporal data query based at least in part on the temporal data request and the critical data; and retrieving temporal data from the data source in response to the temporal data query.

35. The computer program product of claim 34, wherein identifying critical data comprises identifying metadata associated with the data source, the metadata identifying an element of the data source as containing the critical data.

36. The computer program product of claim 35, wherein the element of the data source is a field of a database record.

37. The computer program product of claim 34, wherein the data source comprises eternal data.

38. The computer program product of claim 34, wherein the critical data comprises index date data.

39. The computer program product of claim 34, wherein the critical data comprises right-censor date data.

40. The computer program product of claim 34, wherein the critical data comprises left-censor date data.

41. The computer program product of claim 34, wherein the critical data comprises right-truncation date data.

42. The computer program product of claim 34, wherein the critical data comprises left-truncation date data.

43. The computer program product of claim 34, wherein the data source comprises event chronology data.

44. The computer program product of claim 34, wherein the data source comprises period chronology data.

45. The computer program product of claim 34, wherein the temporal data query is generated by modifying the temporal data request using the critical data.

46. The computer program product of claim 45, wherein the temporal data request is modified by limiting a period chronology of the temporal data request using the critical data.

47. The computer program product of claim 46, wherein the critical data comprises an index date, and wherein the period chronology is limited by truncating a portion of the period chronology occurring before the index date.

48. The computer program product of claim 46, wherein the critical data comprises an index date, and wherein the period chronology is limited by truncating a portion of the period chronology occurring after the index date.

49. The computer program product of claim 46, wherein the critical data comprises a right-censor date, and wherein the period chronology is limited by truncating a portion of the period chronology occurring after the right-censor date.

50. The computer program product of claim 46, wherein the critical data comprises a left-censor date, and wherein the period chronology is limited by truncating a portion of the period chronology occurring before the left-censor date.

51. The computer program product of claim 45, wherein the temporal data request is modified by limiting an event chronology of the temporal data request using the critical data.

52. The computer program product of claim 51, wherein the critical data comprises an index date, and wherein the event chronology is limited by truncating a portion of the event chronology occurring before the index date.

53. The computer program product of claim 51, wherein the critical data comprises an index date, and wherein the event chronology is limited by truncating a portion of the event chronology occurring after the index date.

54. The computer program product of claim 51, wherein the critical data comprises a right-censor date, and wherein the event chronology is limited by truncating a portion of the event chronology occurring after the right-censor date.

55. The computer program product of claim 51, wherein the critical data comprises a left-censor date, and wherein the event chronology is limited by truncating a portion of the event chronology occurring before the left-censor date.

56. The computer program product of claim 45, wherein the temporal data request is modified by modifying an inherited property of an element of the temporal data request using the critical data.

57. The computer program product of claim 34, wherein a first baseline characteristic and a second baseline characteristic are simultaneously stratified.

58. The computer program product of claim 34, further comprising summarizing baseline information contained in the data source.

* * * * *